United States Patent
Cho et al.

(10) Patent No.: US 8,406,193 B2
(45) Date of Patent: Mar. 26, 2013

(54) APPARATUS AND METHOD FOR TRANSMITTING/RECEIVING SYSTEM INFORMATION IN A WIRELESS COMMUNICATION SYSTEM WITH HIERARCHICAL CELL STRUCTURE

(75) Inventors: Young-Bo Cho, Seongnam-si (KR); Seong-Hyeon Chae, Seongnam-si (KR); Jae-Hee Cho, Seoul (KR); Hee-Won Kang, Seongnam-si (KR); Chang-Yoon Oh, Suwon-si (KR); Byung-Wook Jun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 531 days.

(21) Appl. No.: 12/613,019

(22) Filed: Nov. 5, 2009

(65) Prior Publication Data
US 2010/0111062 A1    May 6, 2010

(30) Foreign Application Priority Data
Nov. 5, 2008    (KR) ........................ 10-2008-0109405

(51) Int. Cl.
*H04W 4/00* (2009.01)

(52) U.S. Cl. ........................................ 370/331; 370/338
(58) Field of Classification Search ................. 370/329, 370/331, 338
See application file for complete search history.

(56) References Cited

U.S. PATENT DOCUMENTS

| | | | |
|---|---|---|---|
| 6,256,500 B1 * | 7/2001 | Yamashita | 455/441 |
| 2010/0008317 A1 * | 1/2010 | Bhattad et al. | 370/329 |
| 2010/0322229 A1 * | 12/2010 | Kim et al. | 370/345 |
| 2011/0002293 A1 * | 1/2011 | Yuk et al. | 370/329 |
| 2011/0195720 A1 * | 8/2011 | Han et al. | 455/450 |
| 2011/0201354 A1 * | 8/2011 | Park et al. | 455/456.1 |

* cited by examiner

*Primary Examiner* — Sai-Ming Chan
(74) *Attorney, Agent, or Firm* — Jefferson IP Law, LLP (57) ABSTRACT

An apparatus and method for transmitting/receiving system information in a wireless communication system with a hierarchical cell structure are provided. A method for transmitting system information in a micro Base Station (BS) in a wireless communication system in which at least one micro cell exists within a macro cell includes transmitting first system information to a Mobile Station (MS) communicating with a macro BS within a micro cell and an MS communicating with a micro BS within the micro cell, and transmitting second system information to the MS communicating with the micro BS within the micro cell.

36 Claims, 9 Drawing Sheets

APPARATUS AND METHOD FOR TRANSMITTING/RECEIVING SYSTEM INFORMATION IN A WIRELESS COMMUNICATION SYSTEM WITH HIERARCHICAL CELL STRUCTURE

PRIORITY

This application claims the benefit under 35 U.S.C. §119 (a) of a Korean patent application filed in the Korean Intellectual Property Office on Nov. 5, 2008 and assigned Serial No. 10-2008-0109405, the entire disclosure of which is hereby incorporated by reference.

BACKGROUND OF THE INVENTION

1. Field of the Invention

The present invention relates to an apparatus and method for transmitting/receiving system information in a wireless communication system with a hierarchical cell structure. More particularly, the present invention relates to an apparatus and method in which, in a wireless communication system with a hierarchical cell structure in which a macro cell and a micro cell using the same frequency band are mixed, a Mobile Station (MS) within the micro cell efficiently acquires, despite mutual interference, system information on the macro cell and system information on the micro cell.

2. Description of the Related Art

In a cellular wireless communication system, a channel state may be deteriorated between a Mobile Station (MS) and a Base Station (BS) due to geography, distribution within a cell, a distance between the MS and the BS, and other reasons. The deterioration of the channel state results in signal attenuation and thus communication between the MS and the BS is not smoothly performed. For example, even within a service area of a macro BS, a building may cause a propagation shadow region. If an MS is located in the propagation shadow region, the macro BS fails to perform smooth communication with the MS. Also, if there are commercial districts or public facilities of dense population within the service area of the macro BS, the deterioration of the service may take place. Such conditions make smooth communication between the macro BS and a plurality of MSs very difficult.

In order to address the service problem of the propagation shadow region while increasing the service capacity and providing a high speed data service, the wireless communication system provides a micro cell service such as a hot zone within the coverage area of a macro BS. Because the hot zone is provided in a public place and provides service to a plurality of users, the hot zone acts as interference in the service area of the macro BS. Here, the wireless communication system in which a macro cell and the hot zone are mixed is of a hierarchical cell structure as illustrated in FIG. 1 below.

Figure 1:
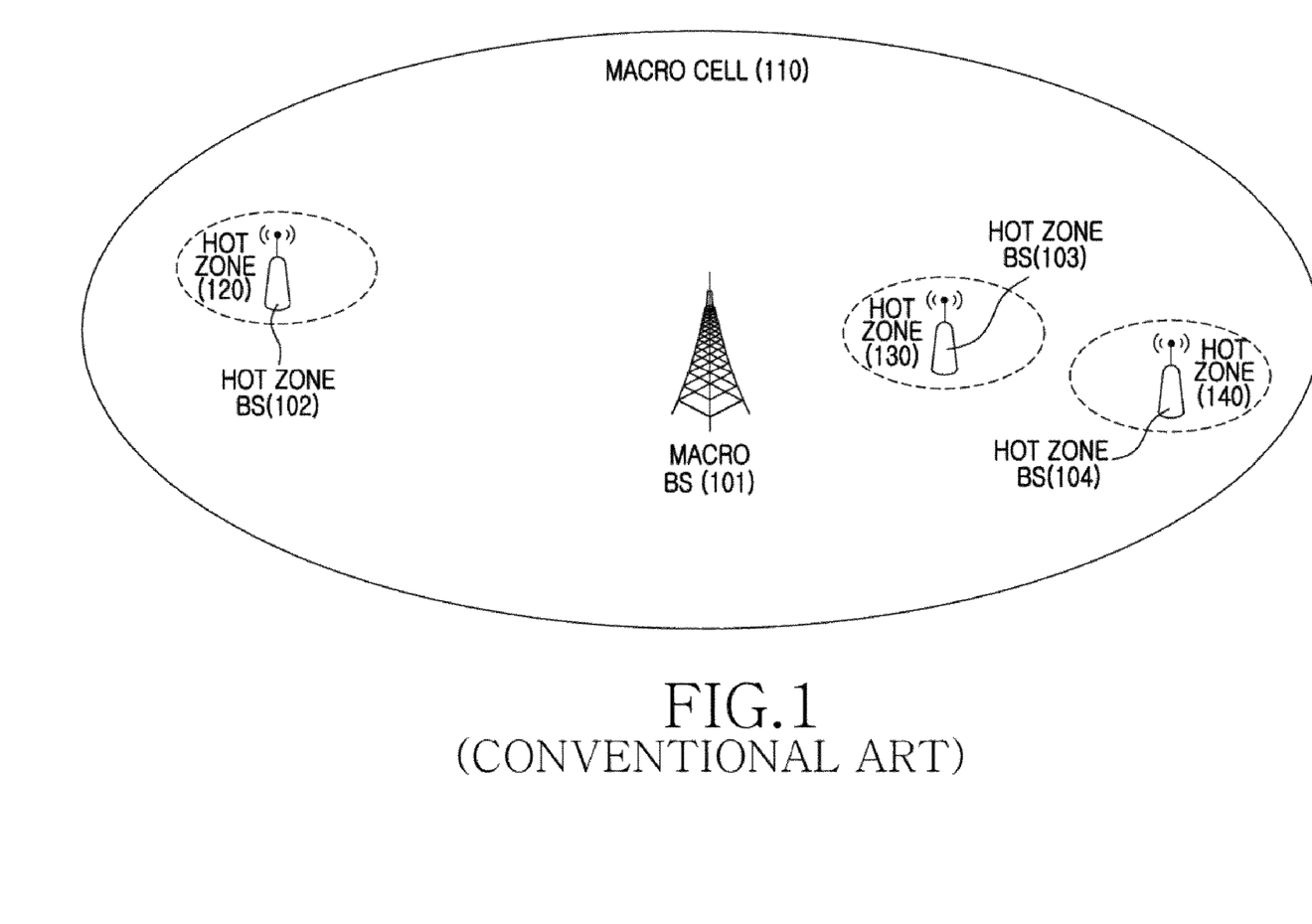
FIG. 1 is a diagram illustrating a hierarchical cell structure of a wireless communication system in which a macro cell and a hot zone are mixed according to the conventional art.

FIG. 1 is a diagram illustrating a hierarchical cell structure of a wireless communication system in which a macro cell and a hot zone are mixed according to the conventional art.

As illustrated in FIG. 1, the wireless communication system includes a macro BS 101 managing a macro cell 110, and hot zone BSs 102, 103, and 104 managing respective hot zones 120, 130, and 140.

Here, the hot zone BSs 102, 103, and 104 and the macro BS 101 use the same frequency band for the sake of the efficient use of frequency resources. If so, a service of the macro BS 101 is greatly affected by interference at a boundary between service areas of the hot zone BSs 102, 103, and 104 and the macro BS 101. Thus, an MS fails to smoothly receive a signal from the macro BS 101. In a wireless communication system having no hot zones, if interference takes place at a boundary between the service area of the macro BS 101 and service areas of neighbor macro BSs, the wireless communication system applies cell planning, sectorization, etc. between the macro BS 101 and the neighbor macro BSs, thus being able to reduce interference between neighbor cells within system requirements. However, if a large number of existing hot zones (e.g., 120, 130, and 140) are included in the macro cell 110, it is difficult to control interference through the cell planning.

On the other hand, if an MS enters a service area of a neighbor BS out of a service area of a serving BS from which the MS receives a service, the MS performs handover to the neighbor BS to receive a seamless service. In the above process, the MS sends and receives a handover message with the serving BS and the neighbor BS (i.e., a target BS) that is intended for handover.

A process of initiating handover according to a request of an MS in an IEEE 802.16e wireless communication system according to the conventional art is described below. An MS periodically measures strengths of preamble signals received from a serving BS and neighbor BSs. At this time, if the signal strength of the serving BS is less than a threshold strength and the signal strength of the neighbor BS is more than a threshold strength, the MS determines the neighbor BS as a target BS and sends a MOBile HandOver REQuest (MOB_HO-REQ) message to the serving BS. Then, upon receiving the handover request message, the serving BS sends a HandOver notification (HO-notification) message to the target BS through a backbone network. Upon receiving the HO-notification message, the target BS sends a HandOver notification ReSPonse (HO-notification-RSP) message to the serving BS and previously prepares a handover process. At this time, the serving BS sends the MS a MOBile HandOver ReSPonse (MOB_HO-RSP) message in reply to the handover request. Upon receipt of the response, the MS determines to perform handover and sends a MOBile HandOver INDication (MOB_HO-IND) message to the serving BS. Then, the MS initiates an operation of handover to the target BS.

In a wireless communication system constituted of only macro cells, the handover process makes it possible to communicate with no interruption even at a boundary between the macro cells. However, in a wireless communication system with a hierarchical cell structure in which a macro cell and one or more hot zones are mixed, a problem taking place at a boundary between cells may not be addressed only through handover. Its causes are provided as follows. First, because there are a great number of hot zones within a macro cell, an MS performs many handover processes according to movement even within a service area of a macro BS. Thus, a large number of the aforementioned handover related messages are exchanged between an MS and a serving BS or target BS. The large number of messages sent results in a problem of reducing the whole system capacity. Second, there is a problem that the coverage of a hot zone is small. The hot zone provides a service coverage area having a radius of 5 meters to 50 meters. If an MS passes the hot zone at high speed, because a passing time within the hot zone is shorter than a handover performance time, the MS has to seamlessly perform handover to a different target BS during handover to the hot zone or soon after handover to the hot zone. Thus, there is a need for a scheme in which, although entering the coverage of a hot zone, an MS moving at high speed may perform communication not with the hot zone but with the macro cell.

If an MS performs communication with a macro cell within a hot zone as above, a BS may allocate a channel resource that causes less interference from the hot zone through efficient scheduling for the sake of data transmission, and enable data retransmission through a Hybrid Automatic Repeat request (HARQ) technique. Thus, in the case of data, it is possible to communicate without interruption even at a boundary between cells. However, in the case of a common control channel such as a preamble signal, system information, etc., it is impossible to alleviate interference through scheduling because a resource region for transmission is previously defined. Also, if the preamble signal, the system information, etc. are not received during a predefined period of time, communication between a BS and an MS is interrupted. Thus, there is a need for a scheme in which, if an MS performs communication with a macro cell within a hot zone, the MS may efficiently acquire the preamble signal, the system information, etc.

As described above, a hot zone provided in a public place may cause significant interference in a service area of a macro BS and give rise to an interruption of a communication service, further resulting in a decrease of a system capacity. Thus, there is a need for an apparatus and method for effectively preventing conditions in which a service of a macro BS is stopped because of interference from a hot zone.

SUMMARY OF THE INVENTION

An aspect of the present invention is to address at least the above-mentioned problems and/or disadvantages and to provide at least the advantages described below. Accordingly, an aspect of the present invention is to provide an apparatus and method for transmitting/receiving system information in a wireless communication system with a hierarchical cell structure.

Another aspect of the present invention is to provide an apparatus and method in which, in a wireless communication system with a hierarchical cell structure in which a macro cell and a micro cell using the same frequency band are mixed, a Mobile Station (MS) within the micro cell efficiently acquires system information on the macro cell and system information on the micro cell despite mutual interference.

The above aspects are addressed by providing an apparatus and method for transmitting/receiving system information in a wireless communication system with a hierarchical cell structure.

In accordance with an aspect of the present invention, a method for transmitting system information in a micro Base Station (BS) in a wireless communication system in which at least one micro cell exists within a macro cell is provided. The method includes transmitting first system information to an MS communicating with a macro BS within a micro cell and an MS communicating with a micro BS within the micro cell, and transmitting second system information to the MS communicating with the micro BS within the micro cell.

In accordance with another aspect of the present invention, a micro BS for transmitting system information in a wireless communication system in which at least one micro cell exists within a macro cell is provided. The micro BS includes a system information generator and a transmitter. The system information generator generates first system information and second system information. The transmitter transmits the first system information to an MS communicating with a macro BS within a micro cell and an MS communicating with a micro BS within the micro cell, and transmits the second system information to the MS communicating with the micro BS within the micro cell.

In accordance with a further aspect of the present invention, a method for receiving system information in an MS communicating with a macro BS within a micro cell, in a wireless communication system in which at least one micro cell exists within a macro cell is provided. The method includes receiving the same system information on the macro cell and the micro cell from a micro BS, and maintaining communication with the macro BS using the received system information.

In accordance with yet another aspect of the present invention, an apparatus for receiving system information in an MS communicating with a macro BS within a micro cell, in a wireless communication system in which at least one micro cell exists within a macro cell is provided. The apparatus includes a receiver and a system information acquisition unit. The receiver receives the same system information on the macro cell and the micro cell from a micro BS. The system information acquisition unit acquires system information through the reception, and maintains communication with the macro BS using the acquired system information.

In accordance with still another aspect of the present invention, a method for receiving system information in an MS communicating with a micro BS within a micro cell, in a wireless communication system in which at least one micro cell exists in a macro cell is provided. The method includes receiving the same system information on the macro cell and the micro cell from the micro BS, receiving system information on the micro cell which is different from system information on the macro cell from the micro BS, and maintaining communication with the micro BS using the received same system information on the macro cell and the micro cell and the received system information on the micro cell which is different from system information on the macro cell.

In accordance with yet another aspect of the present invention, an apparatus for receiving system information in an MS communicating with a micro BS within a micro cell, in a wireless communication system in which at least one micro cell exists within a macro cell is provided. The apparatus includes a receiver and a system information acquisition unit. The receiver receives the same system information on the macro cell and the micro cell from the micro BS, and receives system information on the micro cell which is different from system information on the macro cell from the micro BS. Through the reception, the system information acquisition unit acquires the same system information on the macro cell and the micro cell and system information on the micro cell which is different from system information on the macro cell, and maintains communication with the micro BS using the acquired system information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description when taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The following description is made of a technology in which, in a wireless communication system with a hierarchical cell structure in which a macro cell and a micro cell are mixed, a Mobile Station (MS) within the micro cell efficiently acquires system information on the macro cell and system information on the micro cell despite mutual interference. Here, the micro cell uses the same frequency band as the macro cell. In the following description, a hot zone denotes the micro cell, and a hot zone Base Station (BS) denotes a micro BS managing the micro cell (i.e., a hot zone).

Also, an exemplary embodiment of the present invention is described based on an Institute of Electric and Electronics Engineers (IEEE) 802.16m system, but is also applicable to other next-generation wireless communication systems such as a Long Term Evolution (LTE) system without departing from the spirit and scope of the invention.

Figure 2:
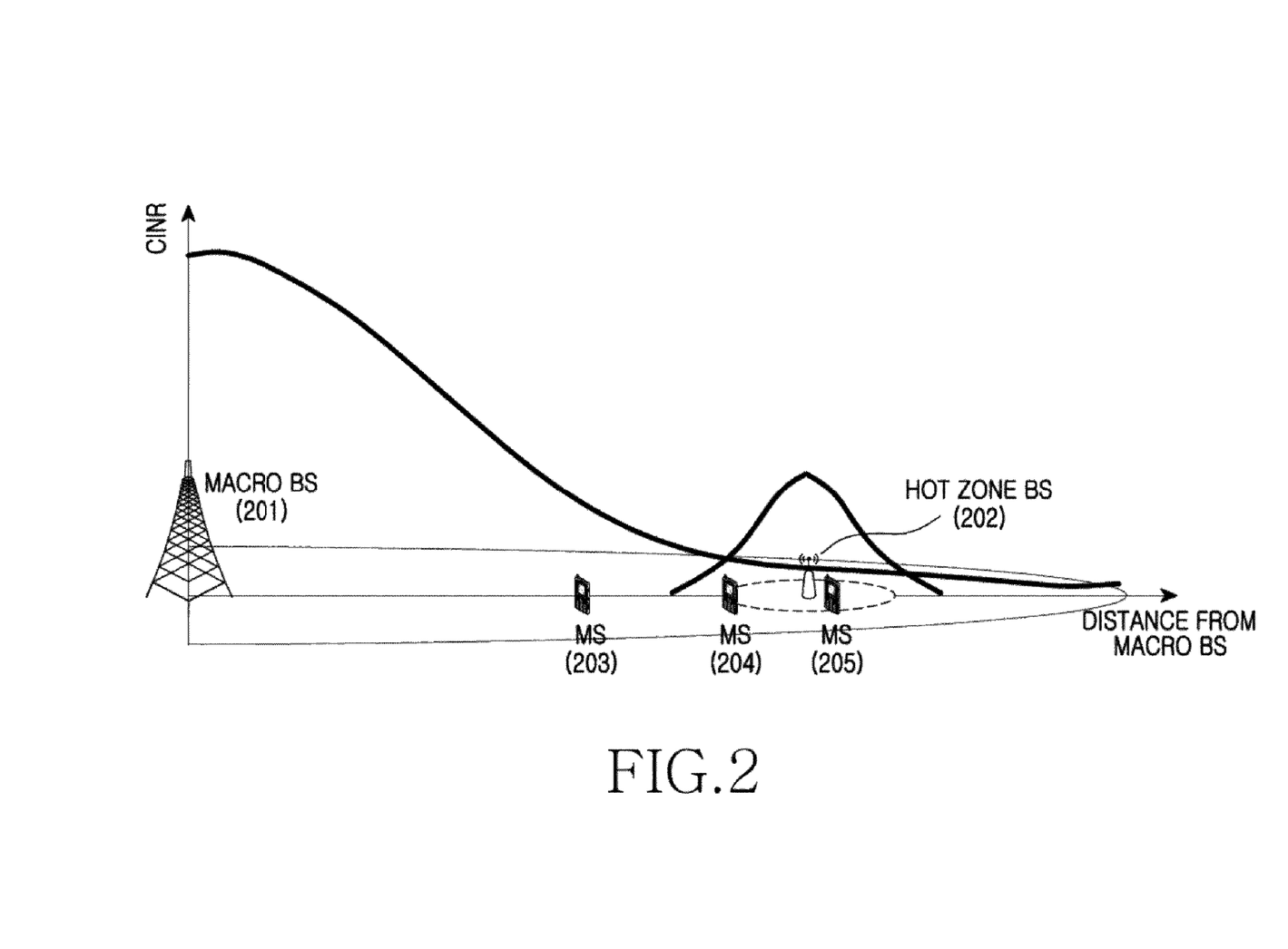
FIG. 2 is a diagram illustrating Carrier to Interference and Noise Ratios (CINRs) of signals transmitted from a macro Base Station (BS) and a hot zone BS dependent on a position of a Mobile Station (MS) in a wireless communication system with a hierarchical cell structure in which a macro cell and a hot zone are mixed according to an exemplary embodiment of the present invention.

FIG. 2 is a diagram illustrating Carrier to Interference and Noise Ratios (CINRs) of signals transmitted from a macro BS and a hot zone BS dependent on a position of an MS in a wireless communication system with a hierarchical cell structure in which a macro cell and a hot zone are mixed according to an exemplary embodiment of the present invention.

Referring to FIG. 2, in the wireless communication system with the hierarchical cell structure in which the macro cell and the hot zone are mixed, an MS may be divided into the following three cases depending on the position of the MS and a user performing communication with the MS:

Case 1) MS 203 communicating with macro BS 201 outside of the hot zone;

Case 2) MS 204 communicating with macro BS 201 within the hot zone; and

Case 3) MS 205 communicating with hot zone BS 202 within the hot zone.

In Case 1, the MS 203 is located out of the hot zone and therefore, although the MS 203 is far away from the macro BS 201, the MS 203 may receive a signal from the macro BS 201 without interference from the hot zone as far as being located within a macro cell. In Case 2, the MS 204 is located within the hot zone and a signal from the hot zone BS 202 is similar in strength with a signal from the macro BS 201. Therefore, the signal from the hot zone BS 202 causes interference when receiving the signal from the macro BS 201. Thus, the MS 204 may not receive a signal from the macro BS 201 in a desired fashion. In Case 3, the MS 205 is located within the hot zone and a signal from the hot zone BS 202 is higher in strength than a signal from the macro BS 201. Thus, the MS 205 may receive the signal from the hot zone BS 202 in a desired fashion.

Figure 3:
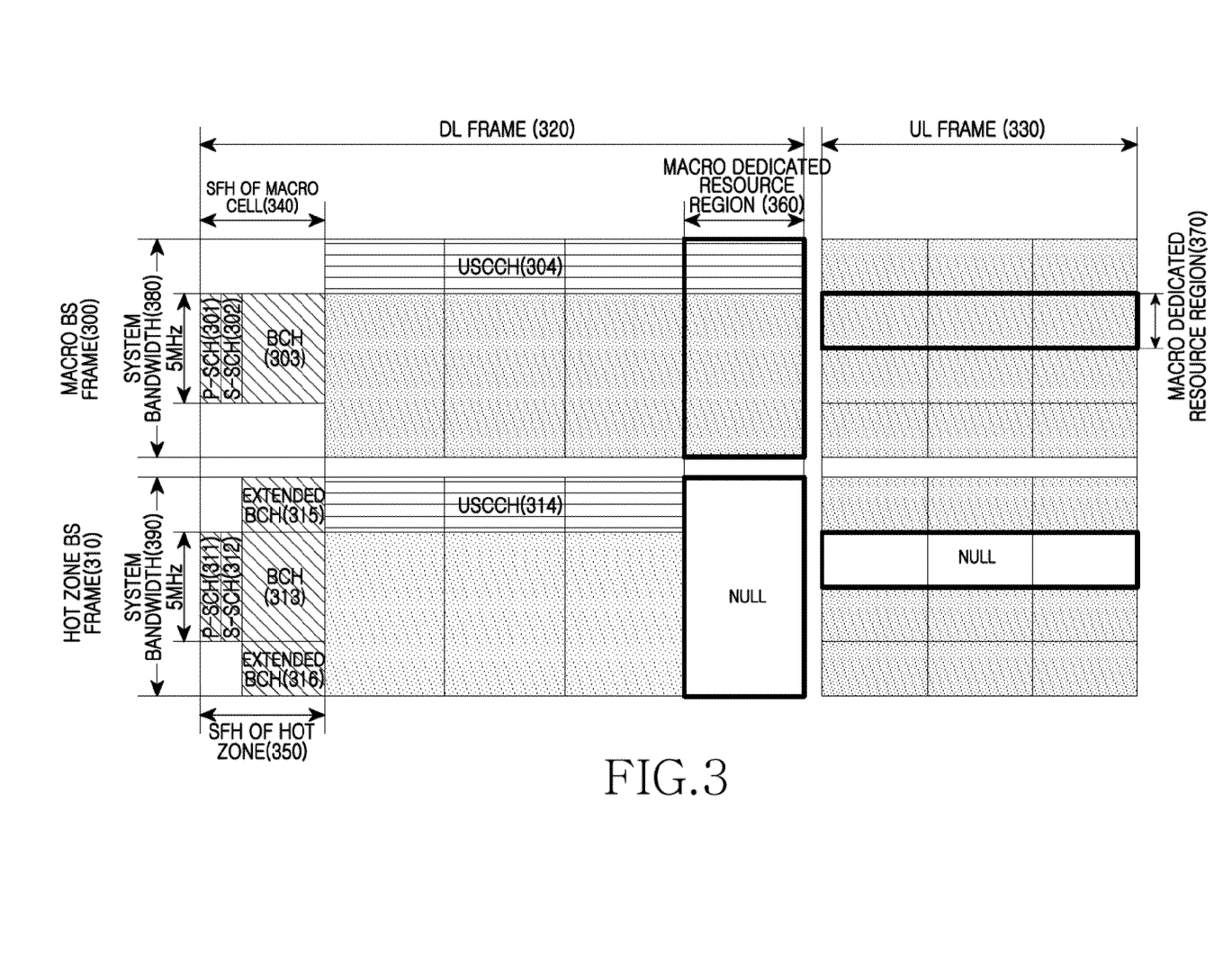
FIG. 3 is a diagram illustrating a frame structure of a wireless communication system with a hierarchical cell structure in which a macro cell and a hot zone are mixed according to an exemplary embodiment of the present invention.
Figure 5:
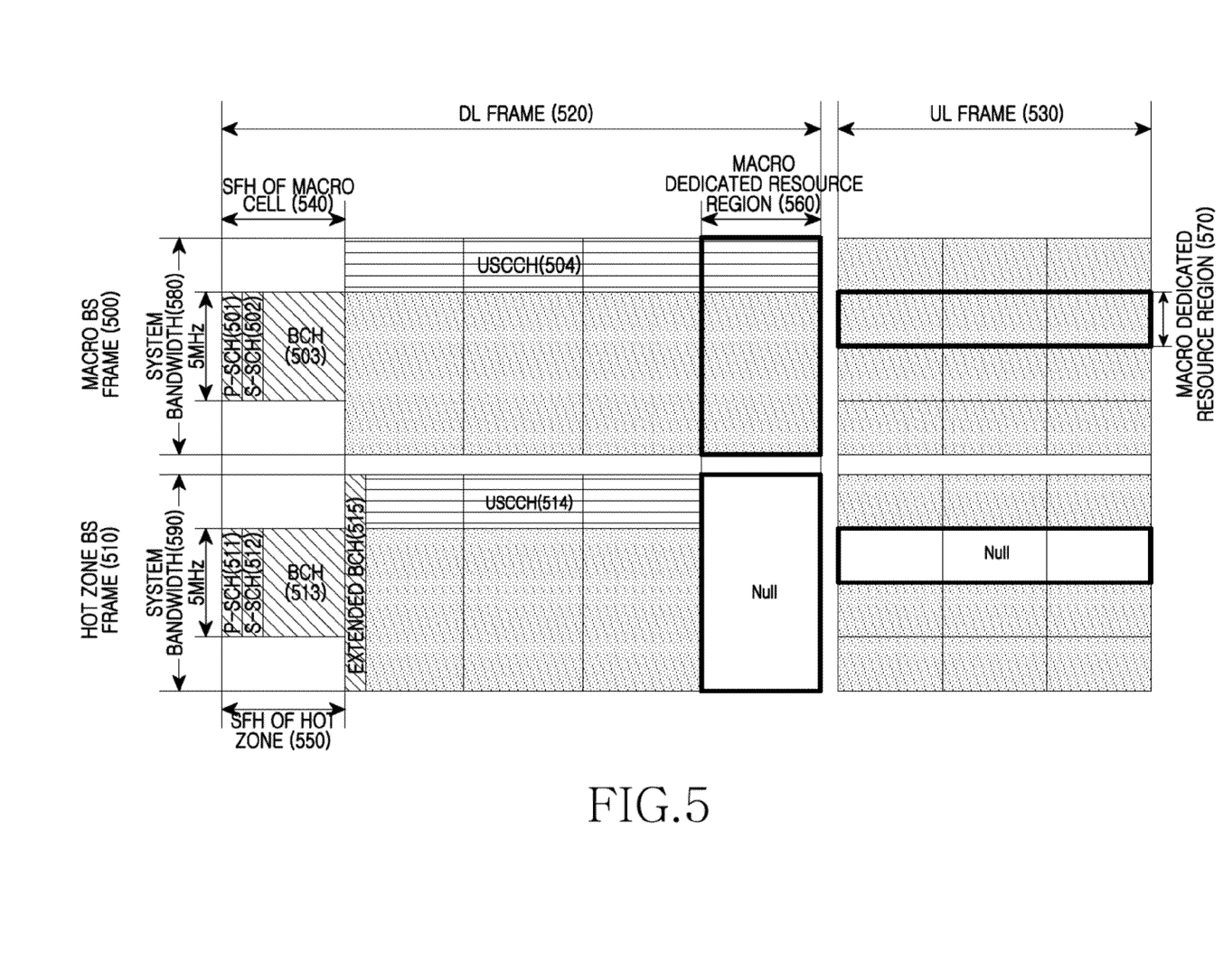
FIG. 5 is a diagram illustrating a frame structure of a wireless communication system with a hierarchical cell structure in which a macro cell and a hot zone are mixed according to an exemplary embodiment of the present invention.

In each of Cases 1, 2, and 3, a method for acquiring system information in a corresponding MS is different. In order to effectively support this, a wireless communication system according to exemplary embodiments of the present invention constructs a frame as illustrated in FIG. 3 or FIG. 5 below. The following description is made for a frame of a Time Division Duplex (TDD) system, for example. However, the following description is extensively applicable even to a Frequency Division Duplex (FDD) system with the same principle.

A frame structure of the TDD system may have a frame constituted of a plurality of sub-frames and a super-frame constituted of a plurality of frames. In the following description, one sub-frame is constituted of a plurality of Orthogonal Frequency Division Multiplexing (OFDM) symbols. Also, the super-frame is constituted of four frames, one frame is constituted of eight sub-frames, and one sub-frame is constituted of six OFDM symbols. According to exemplary embodiments of the present invention, first frames constituting a super-frame are described with reference to FIG. 3 and FIG. 5 below.

FIG. 3 is a diagram illustrating a frame structure of a wireless communication system with a hierarchical cell structure in which a macro cell and a hot zone are mixed according to an exemplary embodiment of the present invention.

Referring to FIG. 3, a macro BS frame 300 and a hot zone BS frame 310 each contain eight sub-frames. Among the respective eight sub-frames of the frames 300 and 310, the first five sub-frames constitute a downlink frame 320, and the remaining three sub-frames constitute an uplink frame 330.

The macro BS frame 300 and hot zone BS frame 310 include regions for transmitting Super-Frame Headers (SFHs) 340 and 350 in first sub-frames of the downlink frame 320, respectively. Here, the SFHs 340 and 350 include Primary-Synchronous CHannels (P-SCHs) 301 and 311 used in a synchronization acquisition process, Secondary-Synchronous CHannels (S-SCHs) 302 and 312 used for distinguishing BSs, Broadcast CHannels (BCH) 303 and 313 including common system information, etc. Here, the SFHs 340 and 350, including the information therein, must be received by an MS under a condition in which the MS is not aware of the system bandwidth 380 or 390. Therefore, the SFHs 340 and 350 are transmitted within a bandwidth of 5 MHz that is the minimum bandwidth unit.

Here, the P-SCHs 301 and 311 are transmitted using the same signal by the current macro BS and hot zone BS. By using repeated patterns of the received P-SCHs 301 and 311, an MS acquires synchronization with a corresponding BS. Thus, the P-SCHs 301 and 311 do not need to distinguish between the hot zone and the macro cell.

Figure 4:
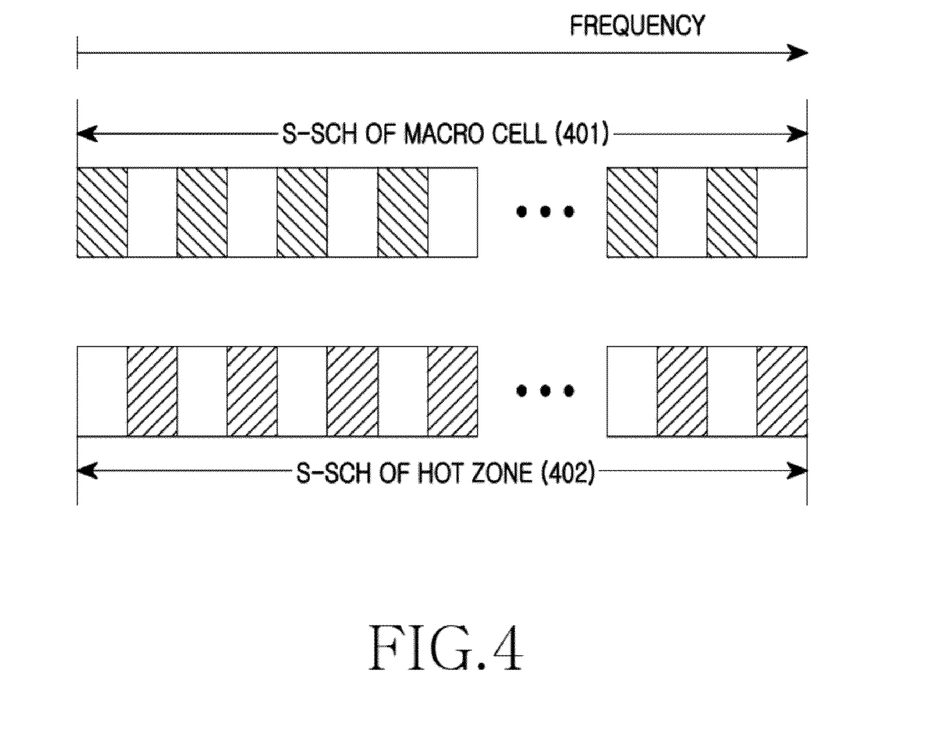
FIG. 4 is a diagram illustrating an example of transmission structures of Secondary-Synchronous CHannels (S-SCHs) of a macro cell and a hot zone according to an exemplary embodiment of the present invention.

Because the S-SCHs 302 transmitted from all macro BSs are encoded with original codes of cells, although the S-SCHs 302 are overlapped in the same resource region and transmitted to an MS, the MS may distinguish the S-SCHs 302. In the hierarchical cell structure, even the S-SCH 312 of the hot zone is encoded alike and thus, basically, the S-SCH 312 may be transmitted using the same resource region as that of the S-SCH 302 transmitted from the macro BS. In another exemplary embodiment of the present invention as illustrated in FIG. 4, if an MS communicating with a macro BS within a hot zone divides an S-SCH 302 of the serving macro BS, transmitted at a very low strength compared to a hot zone BS, the macro BS and the hot zone BS may transmit an S-SCH 401 of a macro cell and an S-SCH 402 of a hot zone using a different resource region. In this case, in order to improve diversity performance, the macro BS and the hot zone BS have to transmit the S-SCHs 401 and 402 of the macro cell and hot zone at a wide band. Thus, the macro BS and the hot zone BS transmit the S-SCH 401 of the macro cell and the S-SCH 402 of the hot zone using an odd-number subcarrier and an even-number sub-carrier, respectively. The MS receives the S-SCHs 401 and 402 through the odd-number and even-number subcarriers, respectively, and is thus able to detect a corresponding BS.

The BCHs 303 and 313 of the macro cell and hot zone are overlapped in the same resource region and are transmitted. Depending on proper BS IDentifiers (BS IDs) acquired through the S-SCHs 302 and 312, the BCHs 303 and 313 are each permutated with different patterns and are transmitted to an MS. The reason for permutating and transmitting the BCHs 303 and 313 is to allow the MS to identify system information on a serving BS from an overlapped and transmitted signal. In an exemplary embodiment of the present invention, the hot zone transmits the same information as the upper macro cell. In this case, an MS communicating with the macro BS within the hot zone may acquire system information on the macro cell using the BCH 313 of the hot zone transmitted at a higher strength.

Also, in an exemplary embodiment of the present invention, for the sake of an MS communicating with a hot zone BS within a hot zone, the SFH 350 of the hot zone additionally includes extended BCHs 315 and 316 including correction system information on the hot zone which is different from system information on a macro cell, in addition to the BCH 313 including system information on the macro cell. Here, the extended BCHs 315 and 316 are transmitted in resource regions other than a band occupied by the BCH 313 within the system bandwidth 390. In general, BCH includes system information such as a bandwidth, a length of a Cyclic Prefix (CP), frame setting information such as an uplink/downlink ratio, frame configuration information, a super-frame number, an information change counter, etc. Among these, the system information is the same in a macro cell and a hot zone, and the majority of the frame setting information excepting the super-frame number is also set as the same values to reduce interference between the macro cell and hot zone and to construct an efficient system. Thus, the correction system information may be designed using a very small amount of information. That is, the BCHs 303 and 313 according to the present invention each include system information and the majority of frame setting information excepting a super-frame number, and the extended BCHs 315 and 316 each include a super-frame number and an information change counter.

The macro BS frame 300 and hot zone BS frame 310 include regions for transmitting User Specific Control CHannels (USCCHs) 304 and 314 and data regions for data transmission in sub-frames other than the first sub-frames of the downlink frame 320, respectively. Here, the USCCHs 304 and 314 represent channels indicating resource allocation information for data transmission to an MS. Also, the macro BS frame 300 and hot zone BS frame 310 each include a data region for data transmission in all of the sub-frames of the uplink frame 330.

The macro BS frame 300 includes a macro dedicated resource region 360 for an MS performing communication with a macro BS within a hot zone, allocated using a partial time resource of the downlink frame 320. For example, the macro BS frame 300 includes the macro dedicated resource region 360 for the MS performing communication with the macro BS within the hot zone, allocated in a sub-frame unit in a Time Division Multiplexing (TDM) scheme.

Also, the macro BS frame 300 includes a macro dedicated resource region 370 for an MS performing communication with a macro BS within a hot zone, allocated using a partial frequency resource of the uplink frame 330. For example, the macro BS frame 300 includes the macro dedicated resource region 370 for the MS performing communication with the macro BS within the hot zone, allocated in a subcarrier unit in a Frequency Division Multiplexing (FDM) scheme. In this case, the MS may address a problem that a service area is limited because of a limitation of transmit power.

The hot zone BS frame 310 does not use the macro dedicated resource regions 360 and 370 such that a signal of a hot zone BS does not interfere with the MS performing communication with the macro BS within the hot zone. That is, the hot zone BS frame 310 constructs the macro dedicated resource regions 360 and 370 as nulls.

In the aforementioned exemplary embodiment of the present invention, the macro BS frame 300 and the hot zone BS frame 310 set the macro dedicated resource regions 360 and 370 to prevent a signal of the hot zone BS from interfering with the MS communicating with the macro BS within the hot zone. At this time, the macro BS allocates the macro dedicated resource regions 360 and 370 only to the MS performing communication with the macro BS itself within the hot zone. Also, the hot zone BS does not use the macro dedicated resources 360 and 370.

In another exemplary embodiment of the present invention, if there is not an MS performing communication with a macro BS within a hot zone, the macro BS and a hot zone BS may use macro dedicated resource regions 360 and 370 identically with different resources.

FIG. 5 is a diagram illustrating a frame structure of a wireless communication system with a hierarchical cell structure in which a macro cell and a hot zone are mixed according to an exemplary embodiment of the present invention.

Referring to FIG. 5, the frame structure of FIG. 5 is substantially similar to that of FIG. 3. That is, the elements 500, 501, 502, 503, 504, 510, 511, 512, 513, 514, 530, 540, 560, 570, 580 and 590 correspond to elements 300, 301, 302, 303, 304, 310, 311, 312, 313, 314, 330, 340, 360, 370, 380 and 390 in FIG. 3. However, the frame structure of FIG. 5 has a difference in that it uses a first symbol of a second sub-frame of a downlink frame 520 if it is impossible to transmit correction system information on a hot zone to a super-frame header 550 of the hot zone. That is, an extended BCH 515 is transmitted using the first symbol of the second sub-frame. In this case, a data region of the second sub-frame has a structure reduced by one symbol as compared to data regions of other sub-frames. Presently, in an Institute of Electrical and Electronics Engineers (IEEE) 802.16m system, the last sub-frame of a downlink frame is designed as a sub-frame having one less symbol to give a Transmission Time Gap (TTG) between uplink/downlink. Thus, the above structure does not act as a burden on a frame design.

Figure 6:
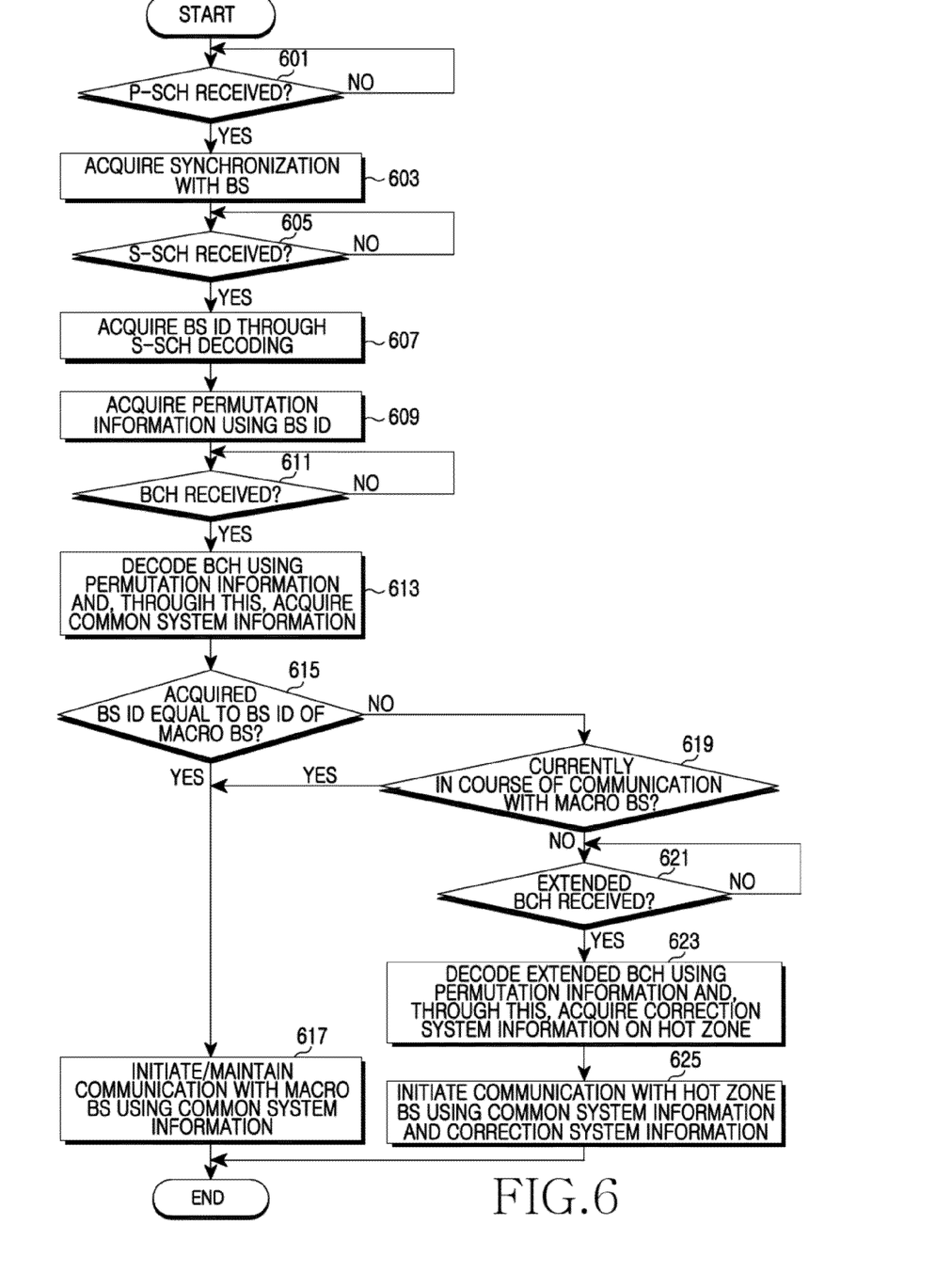
FIG. 6 is a flowchart illustrating a method for acquiring system information in an MS in a wireless communication system with a hierarchical cell structure in which a macro cell and a hot zone are mixed according to an exemplary embodiment of the present invention.

FIG. 6 is a flowchart illustrating a method for acquiring system information in an MS in a wireless communication system with a hierarchical cell structure in which a macro cell and a hot zone are mixed according to an exemplary embodiment of the present invention.

Referring to FIG. 6, in step 601, the MS determines if a P-SCH is received from a BS. When the P-SCH is received from the BS, in step 603, the MS performs a synchronization procedure with the BS using the received P-SCH and acquires synchronization with the BS. In accordance with an exemplary MS division of the present invention, the MS is one of an MS entering a macro cell and initiating communication with a macro BS, an MS entering a hot zone in course of performing communication with the macro BS but maintaining communication with the macro BS, and an MS entering the hot zone and initiating communication with a hot zone BS. Also, the BS is one of a macro BS and a hot zone BS depending on the hierarchical cell structure of the present invention.

In step 605, the MS determines if an S-SCH is received from the BS. When the S-SCH is received from the BS, in step 607, the MS decodes the received S-SCH and acquires a BS ID of the BS. In step 609, the MS acquires permutation information on a BCH to be later received using the acquired BS ID.

In step 611, the MS determines if a BCH is received from the BS. When the BCH is received from the BS, in step 613, the MS decodes the received BCH using the acquired permutation information and, through this, acquires common system information.

In step 615, the MS determines if the acquired BS ID is equal to a BS ID of the macro BS. When it is determined that the acquired BS ID is equal to the BS ID of the macro BS in step 615, the MS determines that the MS itself enters a macro cell and initiates communication with the macro BS and, in step 617, initiates and maintains communication with the macro BS using the acquired common system information.

On the other hand, when it is determined that the acquired BS ID is equal to a BS ID of the hot zone BS in step 615, the MS proceeds to step 619 and determines if the MS is currently in communication with the macro BS. That is, the MS determines if there is a BS ID acquired previously and currently in use for communication and the existing BS ID is equal to the BS ID of the macro BS. If the MS is determined to be currently in communication with the macro BS in step 619, the MS determines that the MS itself enters a hot zone while performing communication with the macro BS but maintains communication with the macro BS and, in step 617, maintains the communication with the macro BS using the acquired common system information.

On the other hand, when it is determined that the acquired BS ID is equal to the BS ID of the hot zone BS while the MS is not currently in communication with the macro BS in step 619, the MS determines that the MS itself enters the hot zone and initiates communication with the hot zone BS. In step 621, the MS determines if an extended BCH is received from the hot zone BS. When the extended BCH is received from the hot zone BS, in step 623, the MS decodes the received extended BCH using the acquired permutation information and, through this, acquires correction system information on the hot zone. Then, in step 625, the MS initiates communication with the hot zone BS using the common system information acquired from the BCH and the correction system information on the hot zone acquired from the extended BCH.

Then, the MS terminates the procedure according to an exemplary embodiment of the present invention.

Figure 7:
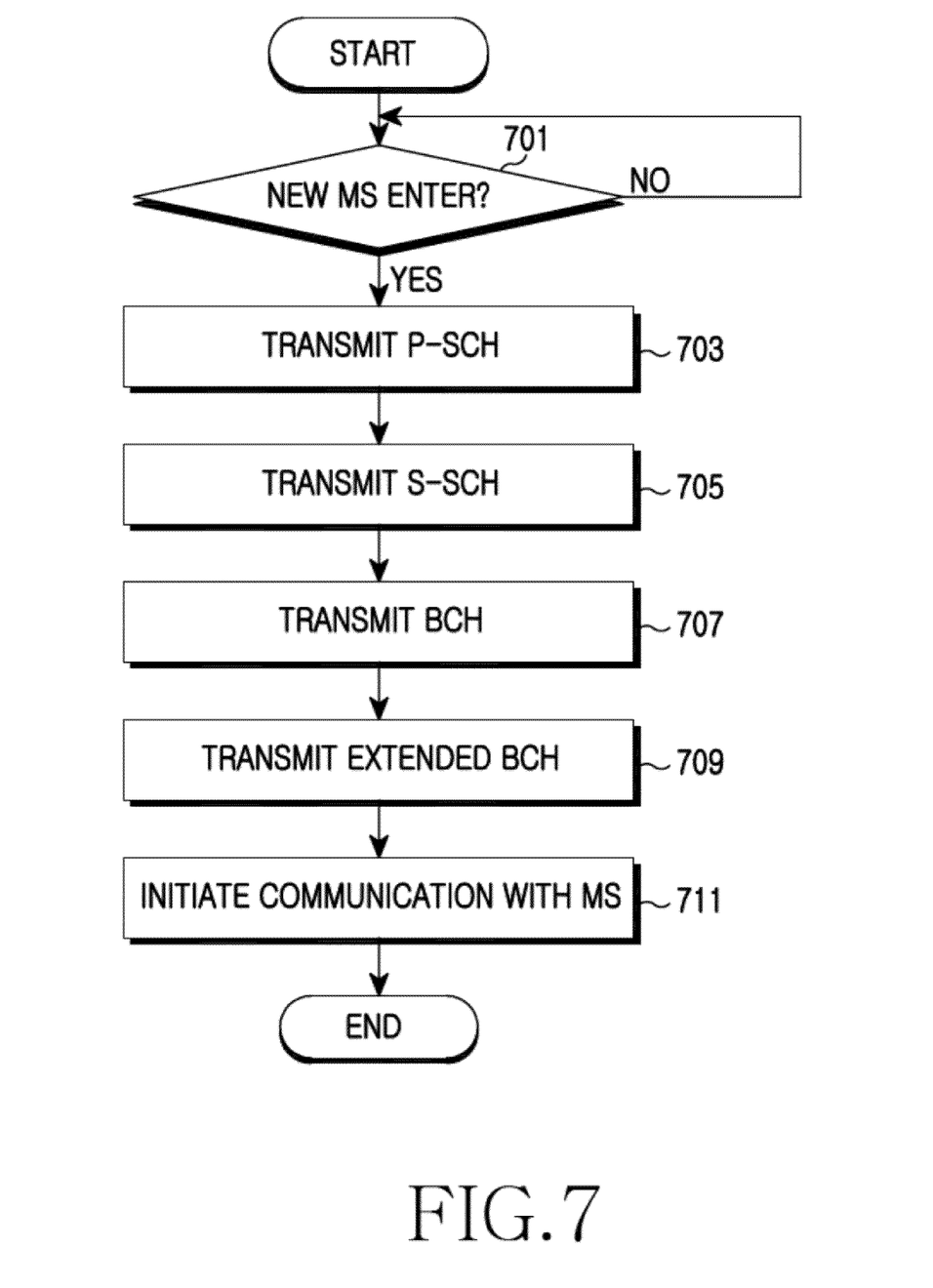
FIG. 7 is a flowchart illustrating a method for transmitting system information in a hot zone BS in a wireless communication system with a hierarchical cell structure in which a macro cell and a hot zone are mixed according to an exemplary embodiment of the present invention.

FIG. 7 is a flowchart illustrating a method for transmitting system information in a hot zone BS in a wireless communication system with a hierarchical cell structure in which a macro cell and a hot zone are mixed according to an exemplary embodiment of the present invention.

Referring to FIG. 7, in step 701, the hot zone BS determines if a new MS enters its coverage area. When the new MS enters its coverage area, the hot zone BS performs a synchronization procedure with the MS irrespective of whether the MS is equal to an MS in service. For this purpose, in step 703, the hot zone BS transmits a P-SCH to the MS.

In step 705, the hot zone BS transmits an S-SCH including its own BS ID information to the MS and, in step 707, transmits a BCH including common system information to the MS.

In step 709, the hot zone BS transmits an extended BCH including correction system information on a hot zone to the MS. In step 711, the hot zone BS initiates communication with the MS receiving the extended BCH, using the common system information and correction system information.

Then, the hot zone BS terminates the procedure according to an exemplary embodiment of the present invention.

Figure 8:
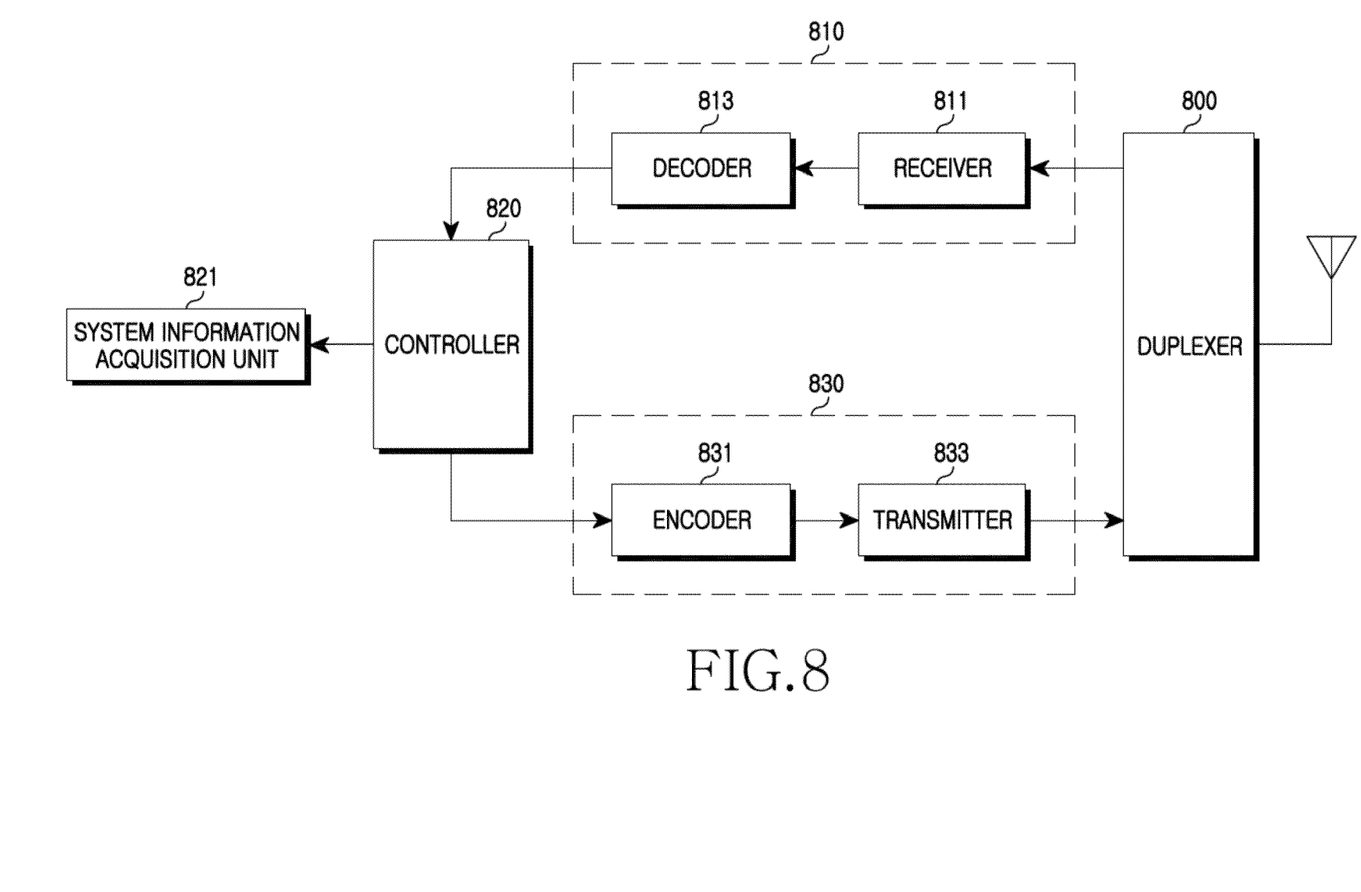
FIG. 8 is a block diagram illustrating an apparatus of an MS in a wireless communication system with a hierarchical cell structure in which a macro cell and a hot zone are mixed according to an exemplary embodiment of the present invention.

FIG. 8 is a block diagram illustrating an apparatus of an MS in a wireless communication system with a hierarchical cell structure in which a macro cell and a hot zone are mixed according to an exemplary embodiment of the present invention.

Referring to FIG. 8, the MS includes a duplexer 800, a receiving unit 810, a controller 820, a system information acquisition unit 821, and a transmitting unit 830.

The duplexer 800 transmits a signal provided from the transmitting unit 830 through an antenna according to a duplexing scheme, and provides a signal received from the antenna to the receiving unit 810.

The receiving unit 810 includes a receiver 811 and a decoder 813.

The receiver 811 converts a high frequency signal provided from the duplexer 800 into a baseband signal. For example, in the case of using an OFDM scheme, the receiver 811 includes a Radio Frequency (RF) processor, an OFDM demodulator, etc. Here, the RF processor converts a high frequency signal provided from the duplexer 800 into a baseband signal. The OFDM demodulator converts a time domain signal provided from the RF processor into a frequency domain signal through Fast Fourier Transform (FFT) operation.

The decoder 813 demodulates and decodes a signal provided from the receiver 811 according to a corresponding modulation level. Here, the modulation level includes a Modulation and Coding Scheme (MCS) level.

The controller 820 processes data and a control signal received from a BS through the receiving unit 810, and provides a P-SCH, an S-SCH, a BCH, and an extended BCH among them to the system information acquisition unit 821. Also, the controller 820 generates data and a control signal and transmits the generated data and control signal to the BS through the transmitting unit 830.

The system information acquisition unit 821 receives a P-SCH from a BS and acquires synchronization with the BS, receives an S-SCH and identifies the BS, and receives a BCH and acquires common system information. Also, if the identified BS is equal to a macro BS, or the identified BS is equal to a hot zone BS but is currently in communication with the macro BS, the system information acquisition unit 821 initiates/maintains communication with the macro BS using the acquired common system information. On the other hand, if the identified BS is equal to the hot zone BS while not currently in communication with the macro BS, the system information acquisition unit 821 additionally receives an extended BCH from the hot zone BS, acquires correction system information on a hot zone, and initiates communication with the hot zone BS using the acquired common system information and correction system information.

The transmitting unit 830 includes an encoder 831 and a transmitter 833.

The encoder 831 encodes and modulates a signal provided from the controller 820 according to a corresponding modulation level.

The transmitter 833 converts the encoded and modulated signal provided from the encoder 831 into a high frequency signal. For example, in the case of using an OFDM scheme, the transmitter 833 includes an RF processor, an OFDM modulator, etc. Here, the OFDM modulator converts a frequency domain signal provided from the encoder 831 into a time domain signal through Inverse Fast Fourier Transform (IFFT) operation. The RF processor converts a baseband signal provided from the OFDM modulator into a high frequency signal.

In the aforementioned construction, the controller 820 may perform a function of the system information acquisition unit 821. These are separately constructed and shown in order to distinguish and describe respective exemplary functions in the present invention. Thus, in an actual realization, construction may be such that the controller 820 processes the function of the system information acquisition unit 821.

Figure 9:
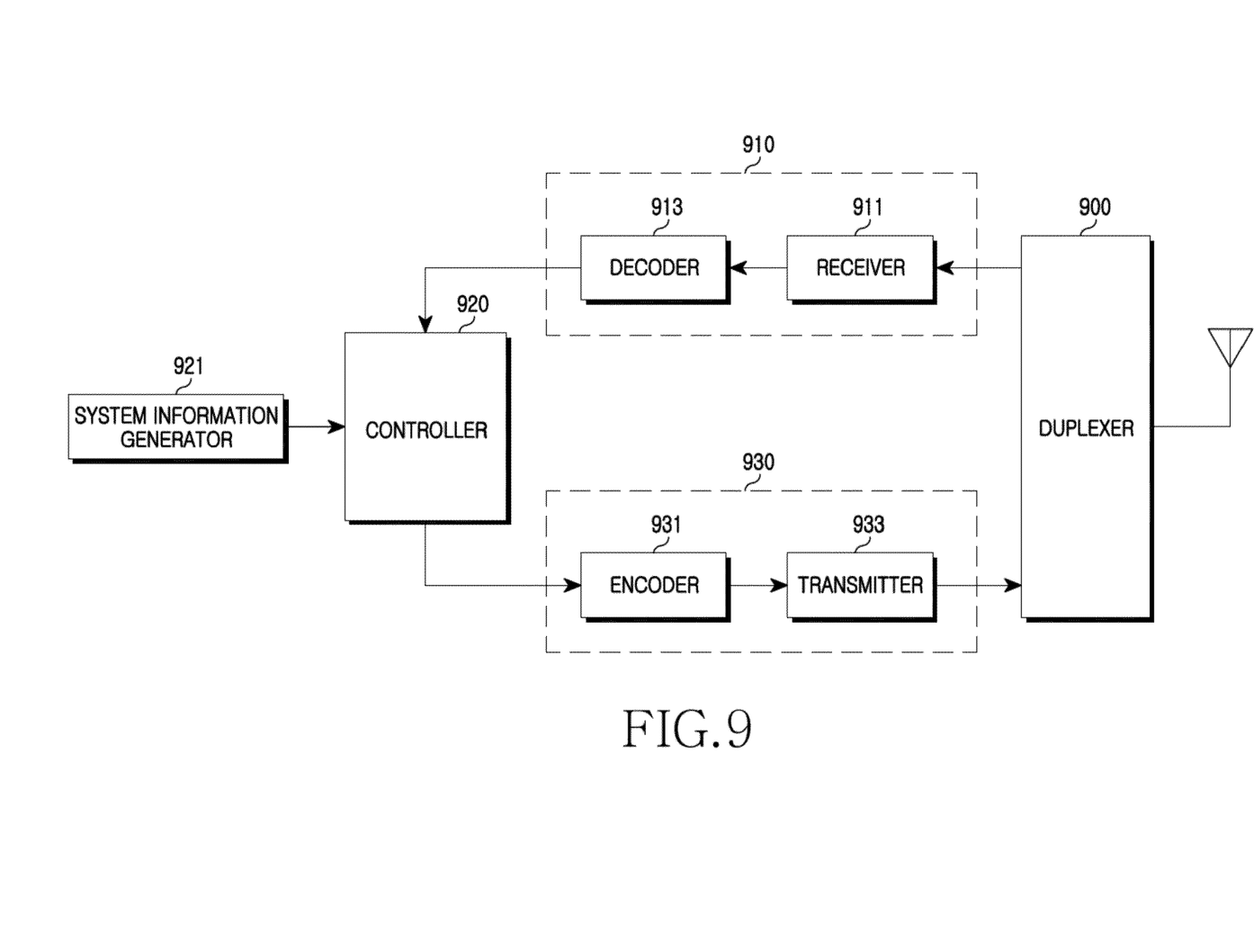
FIG. 9 is a block diagram illustrating an apparatus of a BS in a wireless communication system with a hierarchical cell structure in which a macro cell and a hot zone are mixed according to an exemplary embodiment of the present invention.

FIG. 9 is a block diagram illustrating an apparatus of a BS in a wireless communication system with a hierarchical cell structure in which a macro cell and a hot zone are mixed according to an exemplary embodiment of the present invention. A macro BS and a hot zone BS have substantially the same apparatus construction. Thus, operations of the macro BS and the hot zone BS are described below with reference to a single apparatus construction.

Referring to FIG. 9, the BS includes a duplexer 900, a receiving unit 910, a controller 920, a system information generator 921, and a transmitting unit 930.

The duplexer 900 transmits a signal provided from the transmitting unit 930 through an antenna according to a duplexing scheme, and provides a signal received from the antenna to the receiving unit 910.

The receiving unit 910 includes a receiver 911 and a decoder 913.

The receiver 911 converts a high frequency signal provided from the duplexer 900 into a baseband signal. For example, in the case of using an OFDM scheme, the receiver 911 includes an RF processor, an OFDM demodulator, etc. Here, the RF processor converts a high frequency signal provided from the duplexer 900 into a baseband signal. The OFDM demodulator converts a time domain signal provided from the RF processor into a frequency domain signal through FFT operation.

The decoder 913 demodulates and decodes a signal provided from the receiver 911 according to a corresponding modulation level.

The controller 920 generates data and a control signal and transmits the generated data and control signal to an MS through the transmitting unit 930. More particularly, the controller 920 transmits a P-SCH, an S-SCH, a BCH, and an extended BCH from the system information generator 921 to the MS. Also, the controller 920 processes data and a control signal received from the MS through the receiving unit 910.

When a new MS enters a service area of a BS, the system information generator 921 generates a P-SCH used in a synchronization acquisition process, an S-SCH used for distinguishing BSs, and a BCH including common system information, and transmits the P-SCH, S-SCH, and BCH to the MS. If the BS is equal to a hot zone BS, the system information generator 921 additionally generates an extended BCH including correction system information on a hot zone, and transmits the extended BCH to the MS.

The transmitting unit 930 includes an encoder 931 and a transmitter 933.

The encoder 931 encodes and modulates a signal provided from the controller 920 according to a corresponding modulation level.

The transmitter 933 converts the encoded and modulated signal provided from the encoder 931 into a high frequency signal. For example, in the case of using an OFDM scheme, the transmitter 933 includes an RF processor, an OFDM modulator, etc. Here, the OFDM modulator converts a frequency domain signal provided from the encoder 931 into a time domain signal through IFFT operation. The RF processor converts a baseband signal provided from the OFDM modulator into a high frequency signal.

In the aforementioned construction, the controller 920 may perform a function of the system information generator 921. These are separately constructed and shown in order to distinguish and describe respective exemplary functions in the present invention. Thus, in an actual realization, construction may be such that the controller 920 processes the function of the system information generator 921.

As described above, exemplary embodiments of the present invention provide an apparatus and method for transmitting/receiving system information in a wireless communication system of a hierarchical cell structure in which a macro cell and a micro cell using the same frequency band are mixed, thereby providing an advantage in which an MS within the micro cell may efficiently acquire system information on the macro cell and system information on the micro cell despite mutual interference. Further, there is an advantage that, by efficiently acquiring the system information, it is possible to communicate with no interruption even without unconditional performance of handover to the micro cell and thus, being capable of increasing a capacity of the whole system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting system information in a micro Base Station (BS) in a wireless communication system in which at least one micro cell exists within a macro cell, the method comprising:
    transmitting first system information to a Mobile Station (MS) communicating with a macro BS within a micro cell and an MS communicating with a micro BS within the micro cell; and
    transmitting second system information to the MS communicating with the micro BS within the micro cell,
    wherein the first system information comprises the same system information on the macro cell and the micro cell,
    wherein the second system information comprises system information on the micro cell which is different from system information on the macro cell,
    wherein the first system information is transmitted in a first resource region of a frame,
    wherein the second system information is transmitted in a second resource region of the frame, and
    wherein the first resource region and the second resource region do not overlap.

2. The method of claim 1, wherein the transmitting of the first system information comprises transmitting a Broadcast CHannel (BCH) within a super frame header.

3. The method of claim 1, wherein the transmitting of the second system information comprises transmitting in a resource region not occupied by a BCH within a super frame header.

4. The method of claim 1, wherein the transmitting of the second system information comprises transmitting a first symbol of a sub-frame next to a super frame header.

5. The method of claim 1, further comprising, before the transmitting of the first system information, transmitting a Synchronous CHannel (SCH) to the MS communicating with the macro BS within the micro cell and the MS communicating with the micro BS within the micro cell.

6. The method of claim 5, wherein the transmitting of the SCH comprises transmitting in a resource region that is the same as or different from that of an SCH of the macro BS.

7. A micro Base Station (BS) for system information transmission in a wireless communication system in which at least one micro cell exists within a macro cell, the micro BS comprising:
    a system information generator for generating first system information and second system information; and
    a transmitter for transmitting the first system information to an MS communicating with a macro BS within a micro cell and an MS communicating with a micro BS within the micro cell, and for transmitting the second system information to the MS communicating with the micro BS within the micro cell,
    wherein the first system information comprises the same system information on the macro cell and the micro cell,
    wherein the second system information comprises system information on the micro cell which is different from system information on the macro cell,
    wherein the first system information is transmitted in a first resource region of a frame,
    wherein the second system information is transmitted in a second resource region of the frame, and
    wherein the first resource region and the second resource region do not overlap.

8. The micro BS of claim 7, wherein the first system information is transmitted using a Broadcast CHannel (BCH) within a super frame header.

9. The micro BS of claim 7, wherein the second system information is transmitted using a resource region not occupied by a BCH within a super frame header.

10. The micro BS of claim 7, wherein the second system information is transmitted using a first symbol of a sub-frame next to a super frame header.

11. The micro BS of claim 7, wherein, before the transmitting of the first system information, the transmitter transmits a Synchronous CHannel (SCH) to the MS communicating with the macro BS within the micro cell and the MS communicating with the micro BS within the micro cell.

12. The micro BS of claim 11, wherein the SCH is transmitted using a resource region that is the same as or different from that of an SCH of the macro BS.

13. A method for receiving system information in a Mobile Station (MS) communicating with a macro Base Station (BS) within a micro cell, in a wireless communication system in which at least one micro cell exists within a macro cell, the method comprising:
    receiving first system information from a micro BS;
    receiving second system information on the micro cell from a micro BS; and
    maintaining communication with the macro BS using the received system information,
    wherein the first system information comprises the same system information on the macro cell and the micro cell,
    wherein the first system information is received in a first resource region of a frame,
    wherein the second system information is received in a second resource region of the frame, and
    wherein the first resource region and the second resource region do not overlap.

14. The method of claim 13, wherein the receiving of the system information comprises receiving a Broadcast CHannel (BCH) within a super frame header.

15. The method of claim 13, further comprising, before the receiving of the system information, receiving a Synchronous CHannel (SCH) from the micro BS.

16. The method of claim 15, wherein the SCH is transmitted using a resource region that is the same as or different from that of an SCH of the macro BS.

17. An apparatus for receiving system information in a Mobile Station (MS) communicating with a macro Base Station (BS) within a micro cell, in a wireless communication system in which at least one micro cell exists within a macro cell, the apparatus comprising:

a receiver for receiving first system information and second system information; and a system information acquisition unit for acquiring system information through the reception, and for maintaining communication with the macro BS using the acquired system information, wherein the first system information is received in a first resource region of a frame, wherein the second system information is received in a second resource region of the frame, and wherein the first resource region and the second resource region do not overlap.

18. The apparatus of claim 17, wherein the system information is received using a Broadcast CHannel (BCH) within a super frame header.

19. The apparatus of claim 17, wherein, before the receiver receives the system information, the receiver receives a Synchronous CHannel (SCH) from the micro BS.

20. The apparatus of claim 19, wherein the SCH is received using a resource region that is the same as or different from that of an SCH of the macro BS.

21. A method for receiving system information in a Mobile Station (MS) communicating with a micro Base Station (BS) within a micro cell, in a wireless communication system in which at least one micro cell exists in a macro cell, the method comprising:

receiving the same system information on the macro cell and the micro cell from the micro BS;

receiving system information on the micro cell which is different from system information on the macro cell from the micro BS; and maintaining communication with the micro BS using the received same system information on the macro cell and the micro cell and the received system information on the micro cell which is different from system information on the macro cell, wherein the same system information on the macro cell and the micro cell and the system information on the micro cell which is different from the system information on the macro cell are received in resource regions that do not overlap with each other.

22. The method of claim 21, wherein the receiving of the same system information on the macro cell and the micro cell comprises receiving a Broadcast CHannel (BCH) within a super frame header.

23. The method of claim 21, wherein the receiving of the system information on the micro cell which is different from system information on the macro cell comprises receiving a resource region not occupied by a BCH within a super frame header.

24. The method of claim 21, wherein the receiving of the system information on the micro cell which is different from system information on the macro cell comprises receiving a first symbol of a sub-frame next to a super frame header.

25. The method of claim 21, further comprising, before the receiving of the same system information on the macro cell and the micro cell, receiving a Synchronous CHannel (SCH) from the micro BS.

26. The method of claim 25, wherein the SCH is transmitted using a resource region that is the same as or different from that of an SCH of the macro BS.

27. An apparatus for receiving system information in a Mobile Station (MS) communicating with a micro Base Station (BS) within a micro cell, in a wireless communication system in which at least one micro cell exists within a macro cell, the apparatus comprising:

a receiver for receiving the same system information on the macro cell and the micro cell from the micro BS, and for receiving system information on the micro cell which is different from system information on the macro cell from the micro BS; and a system information acquisition unit for, through the reception, acquiring the same system information on the macro cell and the micro cell and system information on the micro cell which is different from system information on the macro cell, and for maintaining communication with the micro BS using the acquired system information, wherein the same system information on the macro cell and the micro cell and the system information on the micro cell which is different from the system information on the macro cell are received in resource regions that do not overlap with each other.

28. The apparatus of claim 27, wherein the same system information on the macro cell and the micro cell is received using a Broadcast CHannel (BCH) within a super frame header.

29. The apparatus of claim 27, wherein the system information on the micro cell which is different from system information on the macro cell is received using a resource region not occupied by a BCH within a super frame header.

30. The apparatus of claim 27, wherein the system information on the micro cell which is different from system information on the macro cell is received using a first symbol of a sub-frame next to a super frame header.

31. The apparatus of claim 27, wherein, before the receiving of the same system information on the macro cell and the micro cell, the receiver receives a Synchronous CHannel (SCH) from the micro BS.

32. The apparatus of claim 31, wherein the SCH is received using a resource region that is the same as or different from that of an SCH of the macro BS.

33. The method of claim 21, wherein the same system information is transmitted in a first resource region of a corresponding frame, wherein the system information on the micro cell which is different from system information on the macro cell is transmitted in a second resource region of the corresponding frame, and wherein the first resource region and the second resource region do not overlap.

34. The apparatus of claim 27, wherein the same system information is transmitted in a first resource region of a corresponding frame, wherein the system information on the micro cell which is different from system information on the macro cell is transmitted in a second resource region of the corresponding frame, and wherein the first resource region and the second resource region do not overlap.

35. The method of claim 1, wherein the first region of the frame in which the first system information transmitted by the micro BS is the same as a region in which the macro BS transmits its corresponding system information.

36. The micro BS of claim 7, wherein the first region of the frame in which the first system information transmitted by the micro BS is the same as a region in which the macro BS transmits its corresponding system information.

* * * * *